US012767506B2

(12) United States Patent
Jeong

(10) Patent No.: US 12,767,506 B2
(45) Date of Patent: Oct. 20, 2026

(54) CART LIFTING DEVICE OF AUTONOMOUS MOBILE ROBOT

(71) Applicant: Hwa Yeong Jeong, Changwon-si (KR)

(72) Inventor: Hwa Yeong Jeong, Changwon-si (KR)

(73) Assignee: TAEWOOLT CO., LTD., Busan (KR)

( * ) Notice: Subject to any disclaimer, the term of this patent is extended or adjusted under 35 U.S.C. 154(b) by 331 days.

(21) Appl. No.: 18/443,187

(22) Filed: Feb. 15, 2024

(65) Prior Publication Data

US 2025/0187883 A1 Jun. 12, 2025

(30) Foreign Application Priority Data

Dec. 12, 2023 (KR) ........................ 10-2023-0179548

(51) Int. Cl.
*B66F 9/06* (2006.01)

(52) U.S. Cl.
CPC .................................... *B66F 9/063* (2013.01)

(58) Field of Classification Search
CPC ...... B66F 5/02; B66F 5/00; B66F 5/04; B66F 9/063; B66F 9/065; B66F 9/12; B66F 7/28; B66F 7/20; B66F 7/243; B25J 5/007; B25J 5/0009; B25J 5/16; B25J 5/00; B25J 5/109; B25J 19/02; B25J 13/08
USPC ...... 414/495, 277; 254/5 R, 5 C, 84, 88, 104
See application file for complete search history.

(56) References Cited

U.S. PATENT DOCUMENTS

| | | | | | |
|---|---|---|---|---|---|
| 2018/0086561 | A1* | 3/2018 | Stubbs | .................... | B65G 1/137 |
| 2023/0052440 | A1* | 2/2023 | Hansen | ...................... | B62B 3/02 |
| 2024/0425335 | A1* | 12/2024 | Shen | ........................ | B60L 53/80 |
| 2025/0358488 | A1* | 11/2025 | Karia | .................... | H04N 21/812 |

* cited by examiner

*Primary Examiner* — Glenn F Myers
(74) *Attorney, Agent, or Firm* — PARK LAW FIRM

(57) ABSTRACT

The present invention relates to a lifting device, which can be used to lift certain goods, and more specifically, to a cart lifting device of an autonomous mobile robot, which can be used to lift a cart part having a conveyor therein to a predetermined height and move the cart part to a specific place by an autonomous mobile robot, thereby preventing wear of wheels (casters) installed on a cart, and transporting goods without additional manpower.

1 Claim, 6 Drawing Sheets

CART LIFTING DEVICE OF AUTONOMOUS MOBILE ROBOT

BACKGROUND OF THE INVENTION

Field of the Invention

The present invention relates to a lifting device, which can be used to lift certain goods, and more specifically, to a cart lifting device of an autonomous mobile robot, which can be used to lift a cart part having a conveyor therein to a predetermined height and move the cart part to a specific place by an autonomous mobile robot, thereby preventing wear of wheels (casters) installed on a cart, and transporting goods without additional manpower.

Background Art

As a device for transporting goods, there is an automatic guided vehicle (AGV). The AGV means a vehicle automatically moving without a driver, and is used in various industrial fields since effectively performing repeated movement of goods.

To address the weaknesses of the AGV, an autonomous mobile robot (AMR) has been developed. The AMR is faster in movement speed than the AGV, can receive guidance of a movement path in real time using various sensors installed thereon, and can adjust the movement path in real time, thereby widening the application range of the AMR.

The AGV or the AMR serves to carry goods on the top thereof and move them to a specific place. When moving with a cart (trolley) on the top thereof, it is preferable to lift the cart to prevent wheel wear, and in this case, a lifting device capable of lifting the cart is needed.

As a conventional art related to automatic transportation of goods, Korean Patent No. 10-2151764 discloses a mobile robot for logistics transportation and a transportation system including the same.

The conventional art proposes a mobile robot for logistics transportation including: a storage space for storing goods; a robot conveyor which is installed inside the storage space, and includes a rotation part on which goods are placed, and a rotation driving part rotating the rotation part; a gear installed in front of the robot conveyor in order to be linked with an external conveyor; and a rotational force transfer part which is installed between a rotary shaft of the rotation part and the gear to transfer a rotational force. The mobile robot for logistics transportation uses all power, such as driving power of the conveyor for carrying and transporting goods and transferring the goods from the inside to the outside, leading to significant battery consumption and shorter usage time.

As another conventional art, Korean Patent No. 10-2339212 discloses a mobile robot for an automatic warehouse transport robot.

The transfer robot for an automatic warehouse that moves along the travel paths formed between the shelves on which boxes are loaded and transfers the boxes comprises: a body having a box loading unit in which the boxes are accommodated; a loading arm for loading the boxes on the shelves or moving the boxes on the shelves to the box loading unit; and a traveling unit provided in a lower portion of the body to move along the traveling paths. The loading arm includes a fixed arm member installed on the body, a moving arm member for supporting and moving the boxes, and several intermediary arm members provided between the fixed and moving arm members to move the moving arm member. The intermediary arm members include a main intermediary arm member installed to contact the fixed arm member, and an auxiliary intermediary arm member provided between the main intermediary arm member and the moving arm member. A pair of main pinion gears, protruding laterally at the front and rear ends, are installed on the main intermediary arm member. The pair of main pinion gears are connected by a main moving belt. A rack is installed on one side of the fixed arm member in the longitudinal direction to correspond to the main pinion gears, and a rack is installed on one side of the auxiliary intermediary arm member in the longitudinal direction to correspond to the main pinion gears, thereby moving both the main and auxiliary intermediary arm members to both sides. A pair of auxiliary pinion gears is installed at the front and rear ends of the auxiliary intermediary arm member to protrude to right and left sides and to be located at a height different from the main pinion gears. The pair of auxiliary pinion gears are connected by an auxiliary moving belt. A rack is installed on one side of both the main intermediary arm member in the longitudinal direction to correspond to the auxiliary pinion gear, and a rack is installed on one side of the moving arm member in the longitudinal direction to correspond to the auxiliary pinion gear, thereby moving the moving arm member to both sides. Guide members are installed in the longitudinal direction on both sides of the main intermediary arm member and one side of the auxiliary intermediary arm member. Guide rollers are installed on one side of the fixed arm member, the other side of the auxiliary intermediary arm member, and one side of the moving arm member in the longitudinal direction such that the top and the bottom thereof are in contact with support jaws formed at the top and the bottom of the guide member. A moving belt unit for moving the main intermediary arm member to both sides is installed on the inner bottom side of the fixed arm member. The traveling unit includes a main traveling unit installed at the bottom of the body for traveling forward and backward, and an auxiliary traveling unit installed at the bottom of the body for traveling to both sides to be able to ascend and descend. When traveling forward and backward, the auxiliary traveling unit travels in a raised state, and when traveling to horizontally, the auxiliary traveling unit moves downward, such that the main traveling unit travels while being raised upwards.

Meanwhile, as a conventional art related to an autonomous mobile robot (AMR) for cart transportation, Korean Patent No. 10-2550889, which has been filed by the same applicant as the present invention, discloses a goods transportation system using an AMR.

The goods transportation system using an AMR, which transports goods within a specific place using an AMR, comprises: an AMR which moves along a predetermined path or a movement path using acquired information; a cart part which is mounted on the AMR for loading goods thereon while moving; and a conveyor part which receives the goods loaded on the cart part and moves the goods to a specific location, wherein the conveyor part includes: a base frame which has a conveyor installed for the transportation of goods; a leg frame which is fixed to the base frame; and a male docking part which is fixed to the base frame for docking with the cart part, and an RFID reader is installed on one side of the conveyor part to detect the proximity of the cart part. The goods transportation system using the AMR includes the lifting part installed to lift the cart part, but takes a method of lifting the cart part using a power base conventionally used. So, it is not easy to adjust the lifting height of the cart part, and power consumption of the AMR is increased due to relatively large volume, so the usage time of the robot is reduced and power usage cost is increased.

PATENT LITERATURE

Patent Documents

Patent Document 1: Korean Patent No. 10-2151764 (published on Sep. 3, 2020)
Patent Document 2: Korean Patent No. 10-2339212 (published on Dec. 14, 2021)
Patent Document 3: Korean Patent No. 10-2550889 (published on Jul. 4, 2023)

SUMMARY OF THE INVENTION

Accordingly, the present invention has been made to solve the above-mentioned problems occurring in the prior arts, and it is an objective of the present invention to provide a cart lifting device of an autonomous mobile robot, which can be used to lift a cart part having a conveyor therein to a predetermined height and move the cart part to a specific place by an autonomous mobile robot, thereby preventing wear of wheels (casters) installed on a cart, and transporting goods without additional manpower.

It is another objective of the present invention to provide a cart lifting device of an autonomous mobile robot, which includes a base plate installed on the autonomous mobile robot, an actuator installed on the base plate, and elevating plates elevated by an action of the actuator, thereby easily adjusting the lifting action and the lifting height by control of the actuator, eliminating the need for a separate driving device, such as a hydraulic device, and realizing the lifting action using a battery mounted in the autonomous mobile robot.

It is another objective of the present invention to provide a cart lifting device of an autonomous mobile robot, in which the elevating plates are installed on both sides of the base plate and a plurality of reinforcing bars are installed between the lifting plates, thereby enhancing the durability of the lifting plates and consistently performing the lifting action.

It is a further objective of the present invention to provide a cart lifting device of an autonomous mobile robot, in which a drive roller is installed on one side of the drive bracket and a "∩" shaped guide bracket is installed on the base plate such that the drive roller moves below the guide bracket not to vertically deviate from a movement path, and a side guide plate is installed on one side of the drive bracket and a side guide roller 25 is installed on the base plate to prevent the drive bracket from laterally deviating from the movement path when the drive bracket moves, thereby ensuring that the elevating plate moves along a consistent path.

To accomplish the above object, according to the present invention, there is provided a cart lifting device of an autonomous mobile robot, which is installed on the autonomous mobile robot to lift goods, including: a plate-shaped base plate which is fixedly installed on the top surface of the autonomous mobile robot; an actuator which is fixedly installed on the base plate and operated by applied power; a drive bar which is fixed to an actuator rod moved reciprocally by the actuator to move depending on the movement of the actuator rod; a drive bracket which is fixedly coupled to the drive bar and has a driving roller fixedly installed on one side to be rotatable; an inclined bracket which is fixedly installed on one side of the drive bracket and has an inclined surface formed at a predetermined angle; an elevating plate which is installed on one side of the inclined bracket to perform an elevating action by the movement of the inclined bracket; and a lifting plate which is fixedly coupled to the elevating plate.

As described above, according to the present invention, the cart lifting device of an autonomous mobile robot can be used to lift the cart part having the conveyor therein to a predetermined height and move the cart part to a specific place by an autonomous mobile robot, thereby preventing wear of wheels (casters) installed on a cart, and transporting goods without additional manpower. Moreover, the cart lifting device of an autonomous mobile robot includes the base plate installed on the autonomous mobile robot, the actuator installed on the base plate, and the elevating plates elevated by an action of the actuator, thereby easily adjusting the lifting action and the lifting height by control of the actuator, eliminating the need for a separate driving device, such as a hydraulic device, and realizing the lifting action using a battery mounted in the autonomous mobile robot. Furthermore, the elevating plates are installed on both sides of the base plate and the plurality of reinforcing bars are installed between the lifting plates, thereby enhancing the durability of the lifting plates and consistently performing the lifting action. Additionally, the drive roller is installed on one side of the drive bracket and the "∩" shaped guide bracket is installed on the base plate such that the drive roller moves below the guide bracket not to vertically deviate from a movement path, and the side guide plate is installed on one side of the drive bracket and the side guide roller 25 is installed on the base plate to prevent the drive bracket from laterally deviating from the movement path when the drive bracket moves, thereby ensuring that the elevating plate moves along a consistent path.

DETAILED DESCRIPTION OF THE PREFERRED EMBODIMENT

The present invention relates to a lifting device, which can be used to lift certain goods, and more specifically, to a cart lifting device of an autonomous mobile robot, which can be used to lift a cart part having a conveyor therein to a predetermined height and move the cart part to a specific place by an autonomous mobile robot, thereby preventing wear of wheels (casters) installed on a cart, and transporting goods without additional manpower.

Hereinafter, preferred embodiments of the present invention will be described in detail with reference to the attached drawings.

Figure 1:
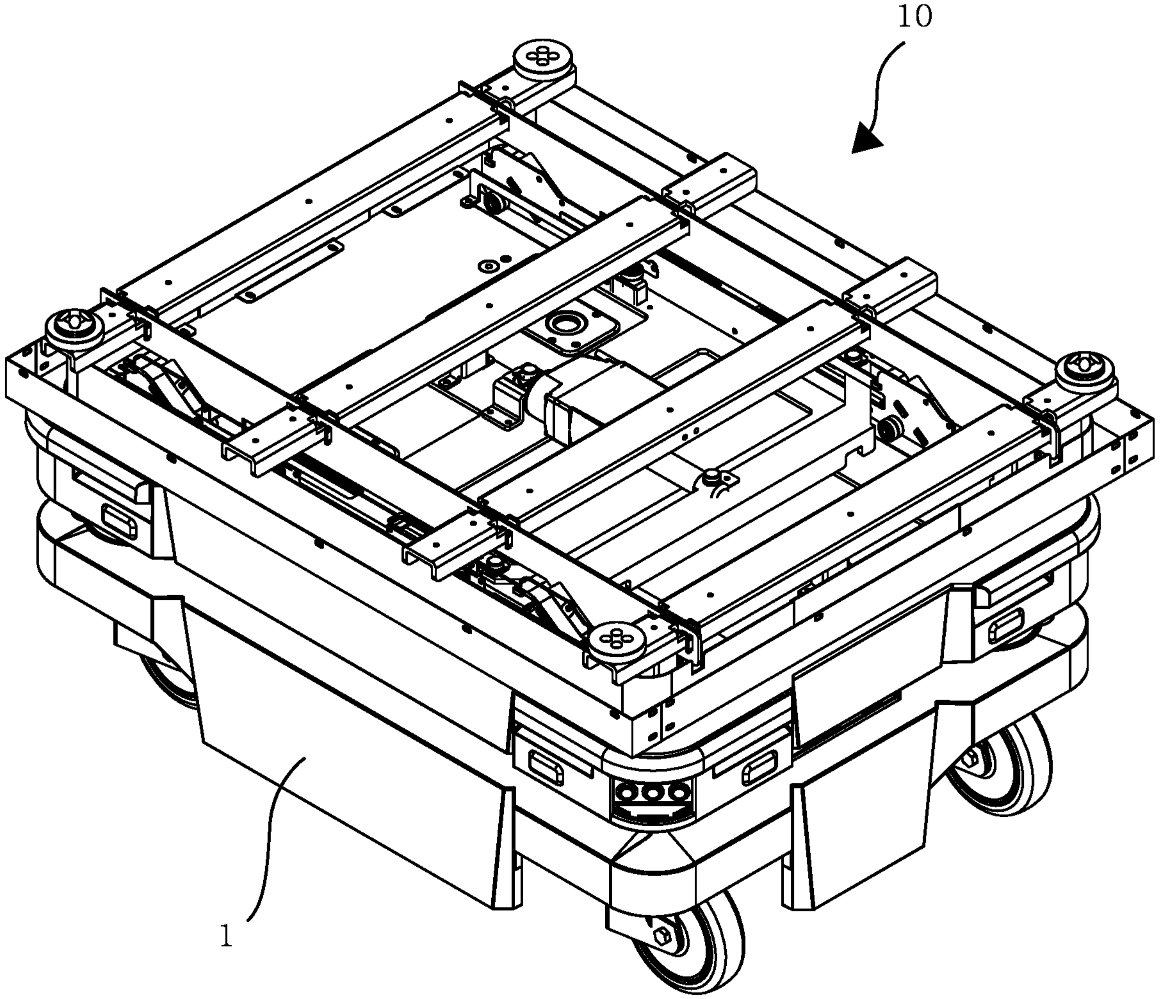
FIG. 1 is a perspective view of an autonomous mobile robot having a lifting device according to the present invention.
Figure 2:
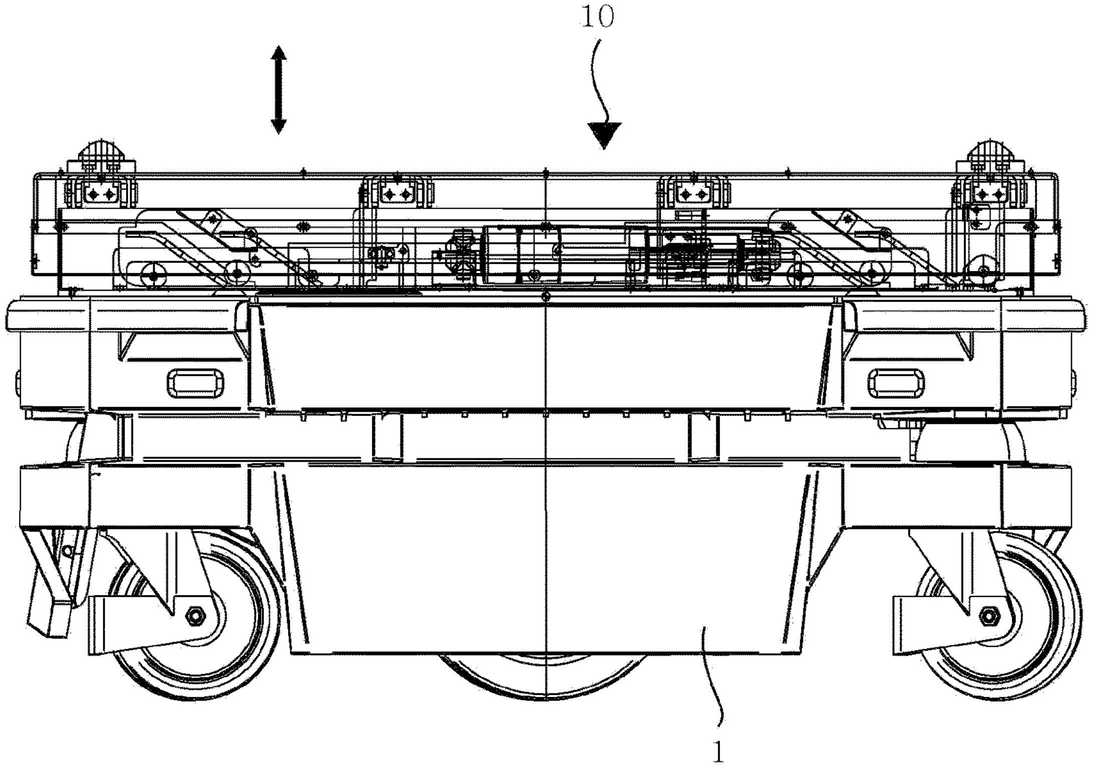
FIG. 2 is a side view of the autonomous mobile robot having the lifting device according to the present invention.
Figure 3:
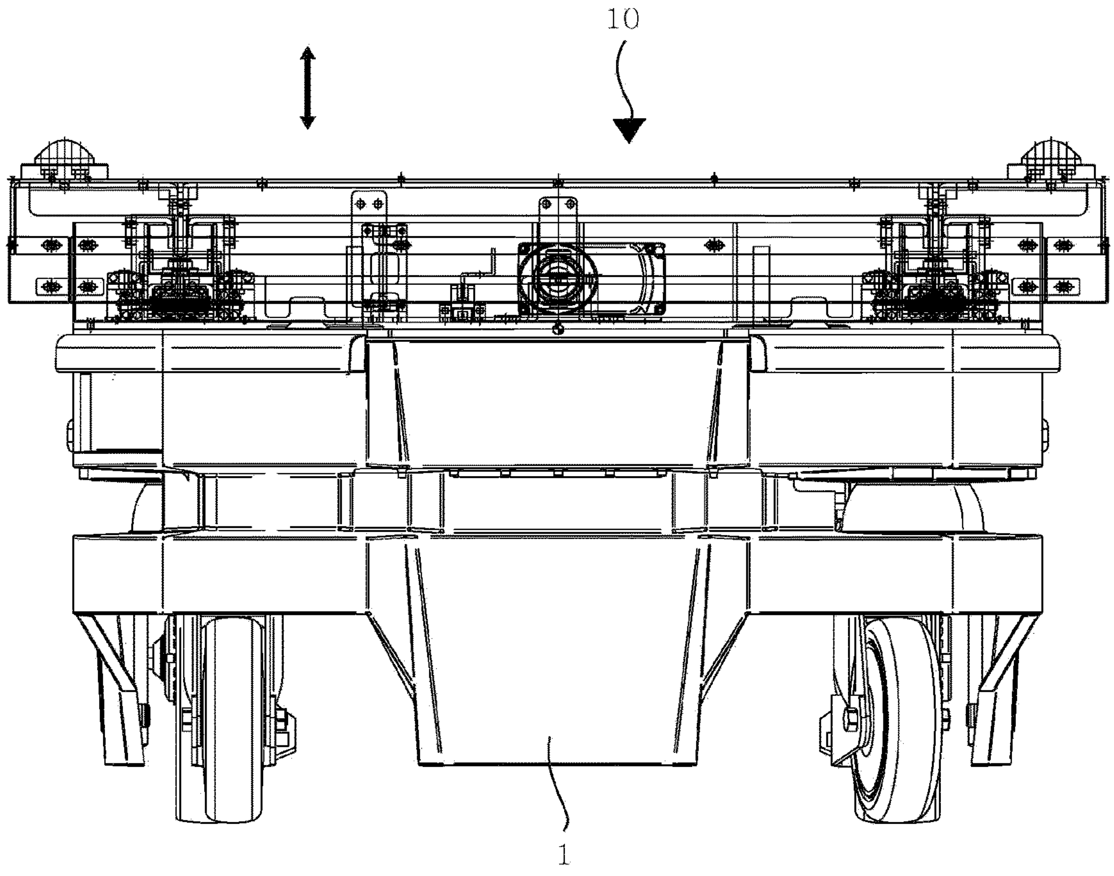
FIG. 3 is a front view of the autonomous mobile robot having the lifting device according to the present invention.

FIG. 1 is a perspective view of an autonomous mobile robot having a lifting device according to the present invention, FIG. 2 is a side view of the autonomous mobile robot having the lifting device according to the present invention, and FIG. 3 is a front view of the autonomous mobile robot having the lifting device according to the present invention. A cart lifting device of an autonomous mobile robot according to the present invention is installed on the top of an autonomous mobile robot 1 and is used to transport specific goods, such as a cart, by the autonomous mobile robot 1 without any manpower. After specific goods for assembly or processing are loaded on a cart part (not illustrated), the autonomous mobile robot (AMR) enters below the cart part on which the goods are loaded, and the cart part is lifted by a lifting device 10 according to the present invention. In the above state, the AMR moves toward a conveyor part to dock the cart part with the conveyor part, thereby transporting the goods stored inside the cart part to the conveyor part.

In this instance, the autonomous mobile robot 1 which is available can be an AMR as illustrated or an AGV robot depending on the usage environment.

Figure 4:
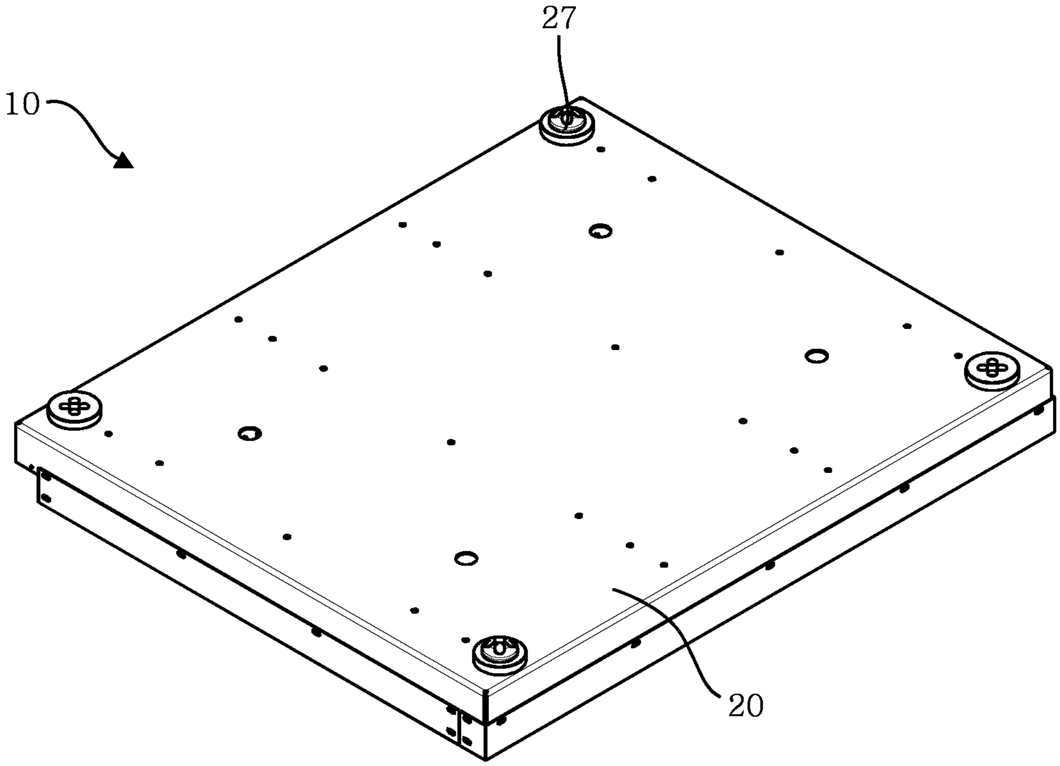
FIG. 4 is a perspective view of the lifting device according to the present invention.
Figure 5:
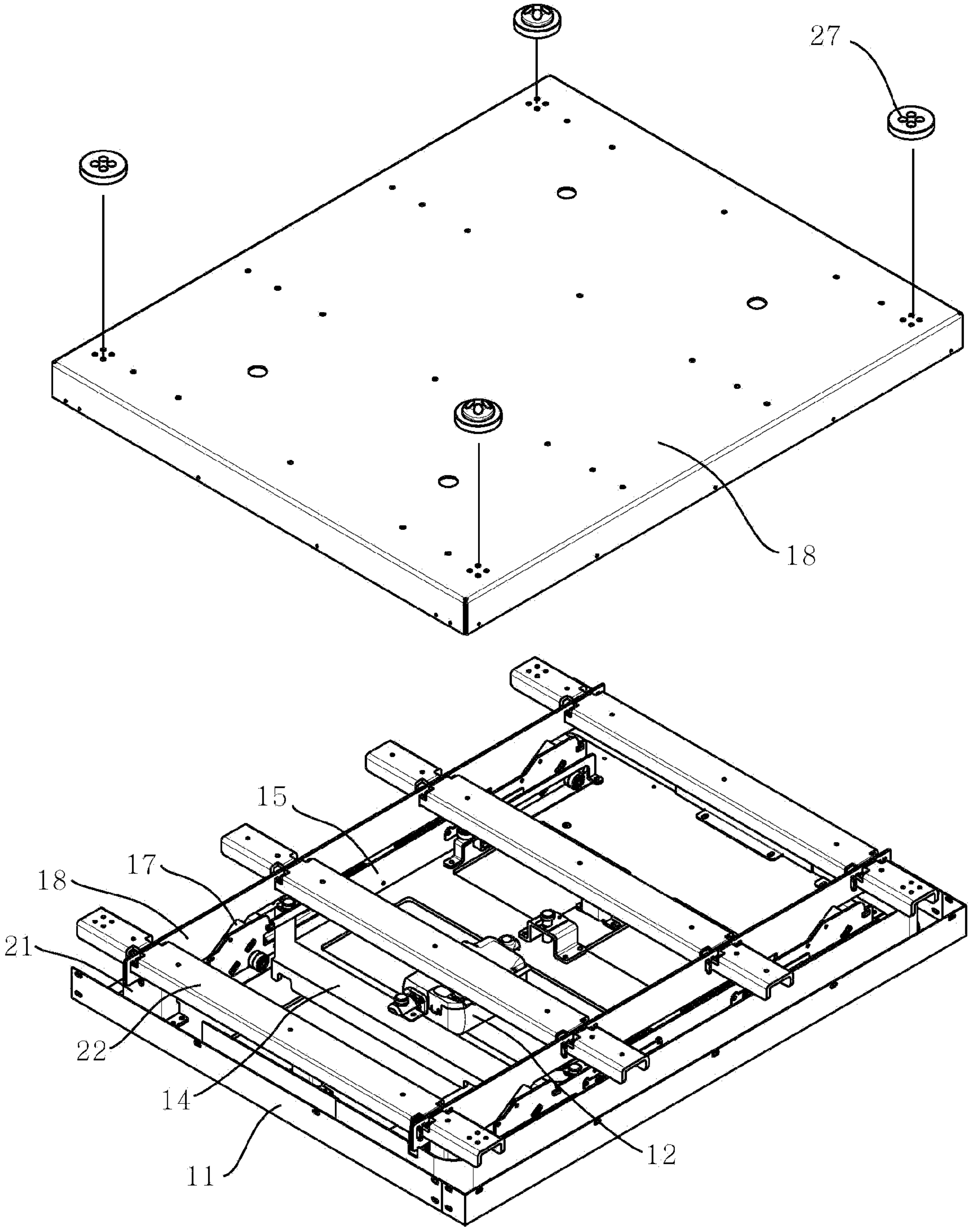
FIG. 5 is a partially exploded view of the lifting device according to the present invention.
Figure 6:
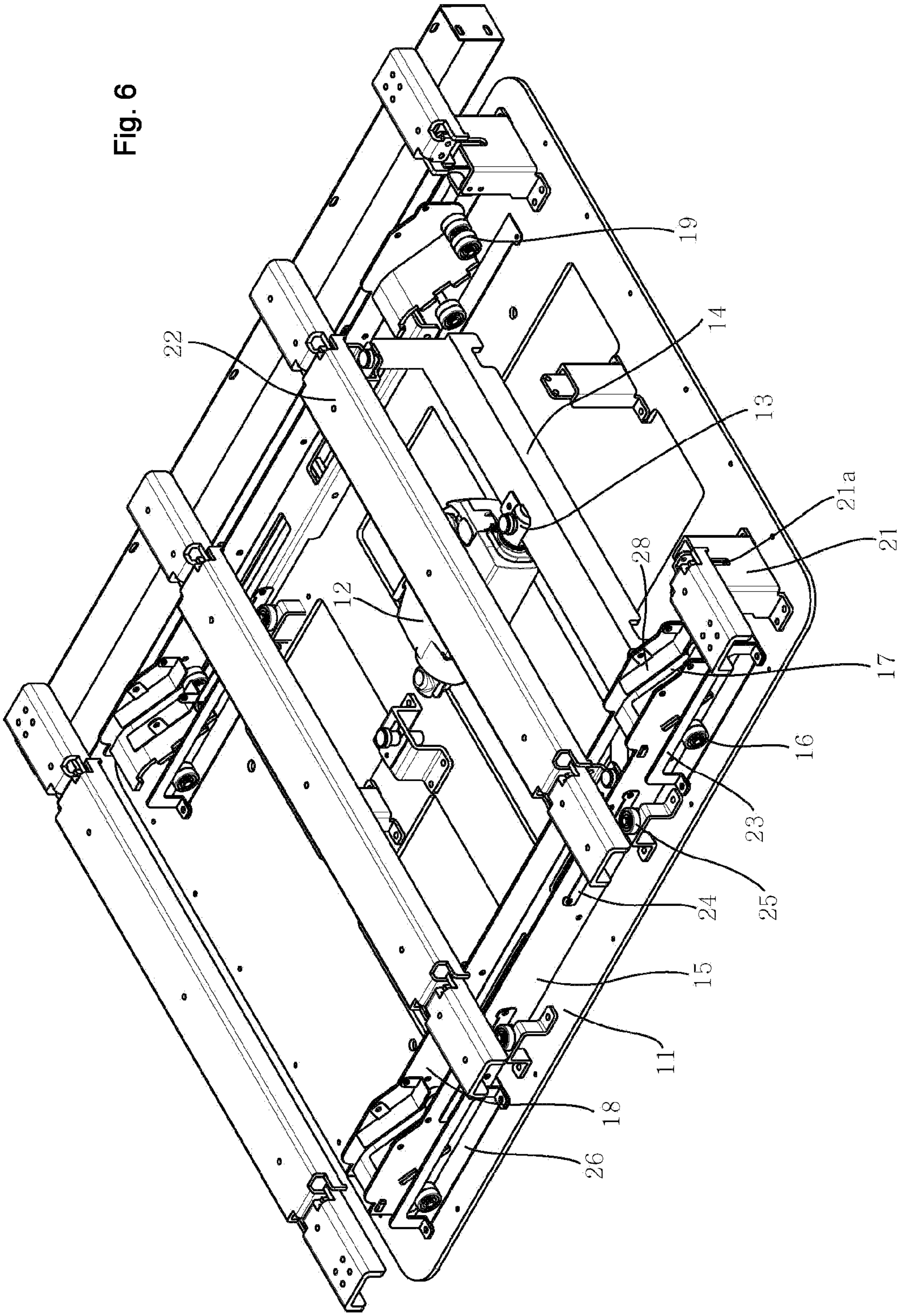
FIG. 6 is a partial configuration diagram of the lifting device according to the present invention.
Figure 7:
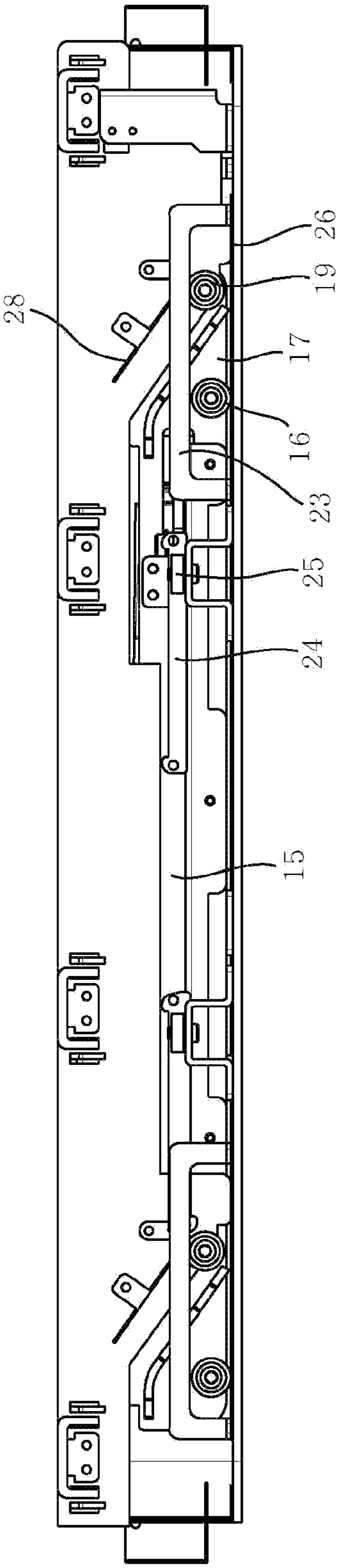
FIG. 7 is a side view, in section, of the lifting device according to the present invention.

FIG. 4 is a perspective view of the lifting device according to the present invention, FIG. 5 is a partially exploded view of the lifting device according to the present invention, FIG. 6 is a partial configuration diagram of the lifting device according to the present invention, and FIG. 7 is a side view, in section, of the lifting device according to the present invention. The cart lifting device of an autonomous mobile robot according to the present invention, which is installed on the autonomous mobile robot 1 to lift goods, includes: a plate-shaped base plate 11 which is fixedly installed on the top surface of the autonomous mobile robot 1; an actuator 12 which is fixedly installed on the base plate 11 and operated by applied power; a drive bar 14 which is fixed to an actuator rod 13 moved reciprocally by the actuator 12 to move depending on the movement of the actuator rod 13; a drive bracket 15 which is fixedly coupled to the drive bar 14 and has a driving roller 16 fixedly installed on one side to be rotatable; an inclined bracket 17 which is fixedly installed on one side of the drive bracket 15 and has an inclined surface formed at a predetermined angle; an elevating plate 18 which is installed on one side of the inclined bracket 17 to perform an elevating action by the movement of the inclined bracket 17; and a lifting plate 20 which is fixedly coupled to the elevating plate 18.

Firstly, the base plate 11 is fixedly installed on the upper surface of the autonomous mobile robot 1. The actuator 12 is fixed to the base plate 11 and operated by applied power. The drive bar 14 is fixed installed on the actuator rod 13 to move together with the actuator rod 13. The drive bracket 15 is fixedly coupled to the drive bar 14 to move along the base plate 11, and the driving roller 16 is installed on one side of the drive bracket 15 to reduce friction during movement. The inclined bracket 17 is fixedly installed on one side of the drive bracket 15 and has the inclined surface formed thereon. The elevating plate 18 is lifted by the operation of the inclined bracket 17, and the lifting plate 20 is fixed coupled to the elevating plate 18.

Therefore, when power is applied to the actuator 12, the actuator rod 13 moves in a direction escaping the actuator 12. The drive bar 14 is moved by the actuator rod 13, and the drive bracket 15 and the inclined bracket 17 are moved together by the movement of the drive bar 14. The elevating plate 18 ascends along the inclined surface of the inclined bracket 17 by the movement of the inclined bracket 17, so the elevating plate 18 and the lifting plate 20 also ascend, such that wheels of the cart part put on the upper portion of the lifting plate 20 are lifted off the ground.

Furthermore, guide blocks 21, which are respectively formed in guide grooves 21*a*, are installed on the square corners of the base plate 11, and the elevating plate 18 performs an elevating action by being guided with respect to an elevation path by the guide grooves 21*a*.

That is, the guide blocks 21, which are respectively formed in guide grooves 21*a*, are installed on the square corners of the base plate 11, and the elevating plate 18 ascends and descends in a state in which a portion of the elevating plate 18 is inserted into the guide grooves 21*a*. Accordingly, the elevating plate 18 vertically ascends and descends without deviating from a path by the guide grooves 21*a* of the guide blocks 21.

Furthermore, the elevating plates 18 are respectively installed on both sides of the base plate 11, and a plurality of reinforcing bars 22 are installed between the elevating plates 18, thereby enhancing the durability of the lifting plate 20 fixedly coupled to the reinforcing bars 22, and consistently performing the lifting action.

That is, the elevating plates 18 are installed on both sides of the base plate 11 when viewed from the movement direction of the robot, and the plurality of reinforcing bars 22 are installed between the elevating plates 18, thereby consistently maintaining the distance between the elevating plates 18, and enhancing the durability of the lifting plate 20. Therefore, the elevating plates 18 can stably perform elevating operations even when a relatively heavy cart is placed on the top of the lifting plate 20.

Additionally, a driven roller 19 is installed on the elevating plate 18, such that the elevating plate 18 ascends since the driven roller 19 ascends while rotating along the inclined surface of the inclined bracket 17 by the operation of the drive bracket 15.

That is, the driven roller 19 is installed on one side of the elevating plate 18. When the drive bracket 15 moves and the inclined bracket 17 also moves, the driven roller 19 ascends while rotating in place along the inclined surface of the inclined bracket 17, such that the elevating plate 18 ascends.

Furthermore, the drive roller 16 is installed on one side of the drive bracket 15, and a "∩" shaped guide bracket 23 is installed on the base plate 11, such that the drive roller 16 moves along the lower portion of the guide bracket 23 without vertically deviating from a movement path. A side guide plate 24 is installed on one side of the drive bracket 15, and a side guide roller 25 is installed on the base plate 11, such that the base plate 11 does not laterally deviate from the movement path when the drive bracket 15 moves.

That is, the drive roller 16 is installed on one side of the drive bracket 15 to reduce friction force while the drive bracket 15 moves along the base plate 11, the "∩" shaped guide bracket 23 is installed on the base plate 11, and the drive roller 16 moves below the "∩" shaped guide bracket 23, so the drive roller 16 cannot move above the guide bracket 23 and does not vertically deviate from the movement path, and the drive bracket 15 does not move vertically relative to the base plate 11, thereby preventing the cart part loaded on the lifting plate 20 from tilting and ascending biasedly.

Additionally, the side guide plate 24 is fixedly installed on one side of the drive bracket 15, and the side guide roller 25 is installed on the base plate 11 to prevent lateral movement when the drive bracket 15 moves and to accurately guide the movement path of the drive bracket 15.

In addition, the drive roller 16 moves along a travel rail 26 installed on the base plate 11 to prevent wear of the drive roller 16. In case of sagging of the base plate 11 due to prolonged use, the travel rail 26 can be conveniently replaced for maintenance.

Moreover, a driven roller guide 28 is installed on one side of the drive bracket 15 to prevent the driven roller 19 from ascending rapidly, thereby stably lifting the cart part seated on the lifting plate 20.

The unexplained reference numeral 27 designates a locator pin, which is fixedly installed on the lifting plate 20 to position the cart part seated on the lifting plate 20.

In the described embodiment, the drive roller 16, the driven roller 19, and the side guide roller 25 can be substituted with bearings instead of using conventional rollers.

As described above, according to the present invention, the cart lifting device of an autonomous mobile robot can be used to lift the cart part having the conveyor therein to a predetermined height and move the cart part to a specific place by an autonomous mobile robot, thereby preventing wear of wheels (casters) installed on a cart, and transporting goods without additional manpower. Moreover, the cart lifting device of an autonomous mobile robot includes the base plate installed on the autonomous mobile robot, the actuator installed on the base plate, and the elevating plates elevated by an action of the actuator, thereby easily adjusting the lifting action and the lifting height by control of the actuator, eliminating the need for a separate driving device, such as a hydraulic device, and realizing the lifting action using a battery mounted in the autonomous mobile robot. Furthermore, the elevating plates are installed on both sides of the base plate and the plurality of reinforcing bars are installed between the lifting plates, thereby enhancing the durability of the lifting plates and consistently performing the lifting action. Additionally, the drive roller is installed on one side of the drive bracket and the "∩" shaped guide bracket is installed on the base plate such that the drive roller moves below the guide bracket not to vertically deviate from a movement path, and the side guide plate is installed on one side of the drive bracket and the side guide roller 25 is installed on the base plate to prevent the drive bracket from laterally deviating from the movement path when the drive bracket moves, thereby ensuring that the elevating plate moves along a consistent path.

What is claimed is:

1. A cart lifting device of an autonomous mobile robot, which is installed on the autonomous mobile robot to lift goods, comprising:

a plate-shaped base plate which is fixedly installed on a top surface of the autonomous mobile robot;

an actuator which is fixedly installed on the base plate and operated by applied power;

a drive bar which is fixed to an actuator rod moved reciprocally by the actuator to move depending on the movement of the actuator rod;

a drive bracket which is fixedly coupled to the drive bar and has a driving roller fixedly installed on one side to be rotatable;

an inclined bracket which is fixedly installed on one side of the drive bracket and has an inclined surface formed at a predetermined angle;

an elevating plate which is installed on one side of the inclined bracket to perform an elevating action by the movement of the inclined bracket; and a lifting plate which is fixedly coupled to the elevating plate;

wherein the drive roller is installed on one side of the drive bracket and an "inverted U" shaped guide bracket is installed on the base plate such that the drive roller moves below the guide bracket not to vertically deviate from a movement path, and wherein a side guide plate is installed on one side of the drive bracket and a side guide roller 25 is installed on the base plate to prevent the drive bracket from laterally deviating from the movement path when the drive bracket moves.

* * * * *